(12) United States Patent
Totsuka et al.

(10) Patent No.: US 6,640,298 B1
(45) Date of Patent: Oct. 28, 2003

(54) BRANCH PREDICTION APPARATUS

(75) Inventors: Yonetaro Totsuka, Tokyo (JP); Yoshio Miki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/544,480

(22) Filed: Apr. 7, 2000

(30) Foreign Application Priority Data

Apr. 12, 1999 (JP) ............................................. 11-103706

(51) Int. Cl.[7] .............................. G06F 9/38; G06F 9/42
(52) U.S. Cl. ........................ 712/239; 712/233; 712/240
(58) Field of Search .............................. 712/239, 240, 712/238, 233, 234, 235, 236, 237, 241

(56) References Cited

U.S. PATENT DOCUMENTS

| | | | | | |
|---|---|---|---|---|---|
| 4,943,908 | A | * | 7/1990 | Emma et al. ................ | 712/240 |
| 5,758,142 | A | * | 5/1998 | McFarling et al. .......... | 712/239 |
| 5,835,754 | A | * | 11/1998 | Nakanishi ................... | 712/239 |
| 6,055,629 | A | * | 4/2000 | Kulkarni et al. ............. | 712/239 |
| 6,081,887 | A | * | 6/2000 | Steely et al. ................. | 712/239 |
| 6,088,793 | A | * | 7/2000 | Liu et al. ..................... | 712/239 |
| 6,253,316 | B1 | * | 6/2001 | Tran et al. ................... | 712/239 |
| 6,374,349 | B1 | * | 4/2002 | McFarling ................... | 712/239 |

* cited by examiner

*Primary Examiner*—Henry W. H. Tsai
(74) *Attorney, Agent, or Firm*—Antonelli, Terry, Stout & Kraus, LLP

(57) ABSTRACT

A branch prediction apparatus to minimize branch penalties in pipeline or concurrent processing of a sequence of instructions correctly predicts a pattern in which "branch taken" and "branch not taken" alternately appear. The apparatus includes a branch prediction table to keep one history bit and a 2-bit counter for each branch instruction, a prediction generator to output a value of the history bit when the counter has a value of 0 or 2 and to output a value obtained by reversing the history bit when the counter has a value of 1 or 3, and a counter controller which compares a result of branch with a value of the history bit. The counter controller sets 0 to the counter value when the result matches the value and adds one to the counter value when the result does not match the value and the counter value is other than 3.

6 Claims, 4 Drawing Sheets t : BRANCH TAKEN
n : BRANCH NOT TAKEN t : BRANCH TAKEN
n : BRANCH NOT TAKEN a : BRANCH DIRECTION EQUAL TO THAT OF PREVIOUS BRANCH
b : BRANCH DIRECTION OPPOSITE TO THAT OF PREVIOUS BRANCH t : BRANCH TAKEN
n : BRANCH NOT TAKEN

BRANCH PREDICTION APPARATUS

BACKGROUND OF THE INVENTION

The present invention relates to a method of and an apparatus for predicting, at execution of a sequence of instructions by a processor, before execution of the branch instruction whether or not a branch instruction in the instruction sequence takes a branch.

General processors today use a pipeline system to execute a sequence of instructions to increase the total throughput. However, the pipeline system alone is not sufficient. Namely, when a branch instruction exists in the instruction sequence, an instruction at a branch destination thereof is only known after the branch instruction is completely executed. This causes an idle period of time in the pipeline and its performance is deteriorated. Particularly, in recent processors of a superscalar type to simultaneously execute a large number of instructions, the performance deterioration is conspicuous. To cope with this disadvantage, at a stage to fetch a branch instruction, whether the branch is "taken" or is "not taken" by the branch instruction is predicted to immediately fetch an instruction subsequent to the branch instruction. Namely, when the prediction is true, the performance is not deteriorated. This technique is called branch prediction and is described in detail, for example, in "Computer Architecture: A Quantitative Approach Second Edition" written by David A. Patterson and John L. Hennessy and published from Morgan Kaufmann Publishers. Inc. in 1996.

According to the literature above, a branch prediction mechanism is implemented by a branch prediction buffer which is accessed by low-order bits of an address of a branch instruction. Each entry of the buffer includes a counter or the like to hold 2-bit information and is updated as shown in a state transition diagrams of FIGS. 2A and 2B according to a result of the branch instruction, i.e., "taken" or "not taken". In FIGS. 2A and 2B, a one-to-one correspondence exists between states 300 to 303 and values of the counter, and letter t or n assigned to an arrow between the states represents a transition condition. In branch prediction, "a branch is taken" is predicted for state 300 or 301 and "a branch is not taken" for state 302 or 303. The prediction method using the 2-bit counter predicts "taken" or "not taken" with a high true prediction ratio for branch instructions for which either "taken" or "not taken" occurs in most cases.

To increase the true prediction ratio, there has been also employed a branch prediction method in which the 2-bit counter corresponds to each historical pattern of branch instructions, not each branch instruction. This method requires, in addition to the branch prediction list, a branch history table to keep, for each branch instruction, several branch results thereof in the past. In the branch prediction of a branch instruction, the system refers to a history pattern of the branch history table by low-order bits of an address of the branch instruction and then refers to the 2-bit counter of the branch prediction table.

In addition to the branch prediction method, there has been used a prediction method using a 2-bit counter corresponding to a pattern of a comprehensive or global history of all branch instructions.

Microprocessors described in the "Microprocessor Report Oct. 26, 1998" and in "The 21264: A Superscalar Alpha Microprocessor with Out-of-Order Execution" of Microprocessor Forum 97th Annual adopt these branch prediction methods. FIG. 3 shows constitution of such microprocessors. A choice prediction 404 according to a global 402 is used to select a result of prediction from a local prediction 401 using a local history 400 for each branch instruction or a result of prediction from a global prediction 403 using a global history 402.

The branch prediction method of the prior art using a 2-bit counter for each branch instruction cannot appropriately predict a pattern of a branch instruction in which the conditions "taken" and "not taken" alternately and consecutively appear. Namely, at least 50% of predictions are false. The prediction method using a counter for the history of each branch instruction can cope with such a branch pattern. However, to hold the history of each branch instruction and to provide an increased number of counters for the history, the constituent components of hardware are considerably increased.

SUMMARY OF THE INVENTION

It is therefore an object of the present invention to provide a branch prediction apparatus in which, while keeping the prediction performance of an imbalanced branch pattern in which either "taken" or "not taken" occurs in most cases and which is suitably handled by the branch prediction method of the prior art, a pattern of a branch instruction in which the conditions "taken" and "not taken" alternately and consecutively appear is appropriately predicted only with a few additional hardware components.

In the method of prior art to select, according to the global history, either one of two predictions including the local and global branch predictions, even when each branch instruction has a tendency towards suitability of either one of the prediction methods, the selection cannot be achieved by directly using the tendency.

Another object of the present invention is to provide a branch prediction apparatus including a branch prediction apparatus above and a global branch prediction apparatus to select a prediction method according to a tendency of each branch instruction.

To achieve the objects in accordance with the present invention, there is provided a branch prediction apparatus comprising a branch prediction table for storing one history bit and a 2-bit counter for each branch instruction, the bit and the counter being updated according to a result of "branch taken" or "branch not taken" for the branch instruction; a prediction generator for outputting, when the counter has a value of 0 or 2 for a branch instruction, a value of the history bit as a result of prediction and for outputting, when the counter has a value of 1 or 3 for a branch instruction, a value obtained by reversing the history bit as a result of prediction; and a counter controller for comparing for a branch instruction a result thereof with a value of the history bit before update, for setting 0 to the counter value when the result matches the value; and for adding, when the result does not match the value and the counter value is other than 3, one to the counter value.

In order to achieve the objects in accordance with the present invention, there is provided a branch prediction apparatus comprising a branch prediction table for storing three prediction bits for each branch instruction, a prediction generator for outputting, when the prediction bits are in one of four states thereof, "branch taken" as a result of prediction and for outputting, when the prediction bits are in other one of the four states thereof, "branch not taken" as a result of prediction; and a prediction bit controller for controlling the prediction bits. The prediction generator generates, when a result of a branch instruction is equal to a previous result thereof, a result of prediction equal to the current result of the branch instruction at next appearance of the branch instruction. The prediction generator generates, when a result of a branch instruction is opposite to a previous result thereof and this condition occurs once or consecutively three times, a result of prediction opposite to the current result of the branch instruction at next appearance of the branch instruction. The prediction generator generates, when a result of a branch instruction is opposite to a previous result thereof and this condition occurs successively two times, a result of prediction equal to the current result of the branch instruction at next appearance of the branch instruction.

To achieve the objects in accordance with the present invention, there is provided a branch prediction apparatus comprising a first branch predictor in accordance with claim 1 or 2, a second branch predictor for predicting a branch instruction according to a comprehensive history of all branch instructions, a choice prediction table for keeping information to be updated according to "true" or "false" of predictions by the first and second branch predictors, and a selector for selecting one of the predictions by the first and second branch predictors according to the information of the choice prediction table.

The branch prediction apparatus further includes a choice table controller for adding a value to the value of the counter when the choice prediction table keeping a counter for each branch instruction and the prediction by the first branch predictor are valid and for subtracting a value from the value of the counter when the prediction by the second branch predictor is valid.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Figure 1:
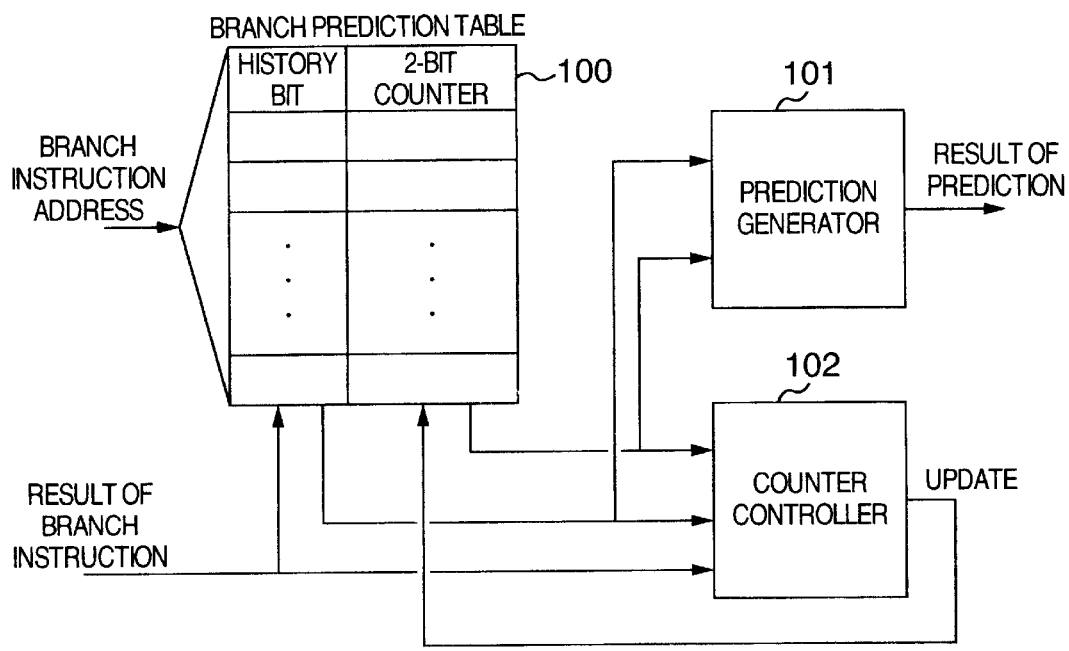
FIG. 1 is a block diagram showing a first embodiment of a branch prediction apparatus in accordance with the present invention.
Figure 2A:
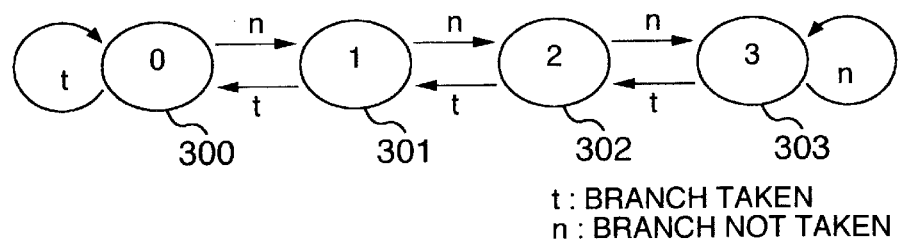
FIGS. 2A and 2B are state transition diagrams of a 2-bit counter used in a branch prediction apparatus of the prior art.
Figure 2B:
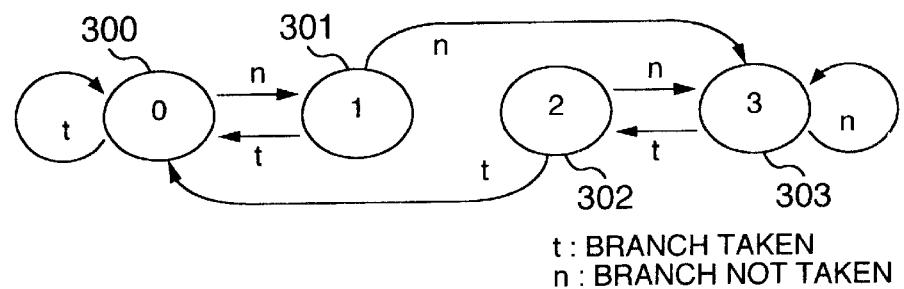
Figure 3:
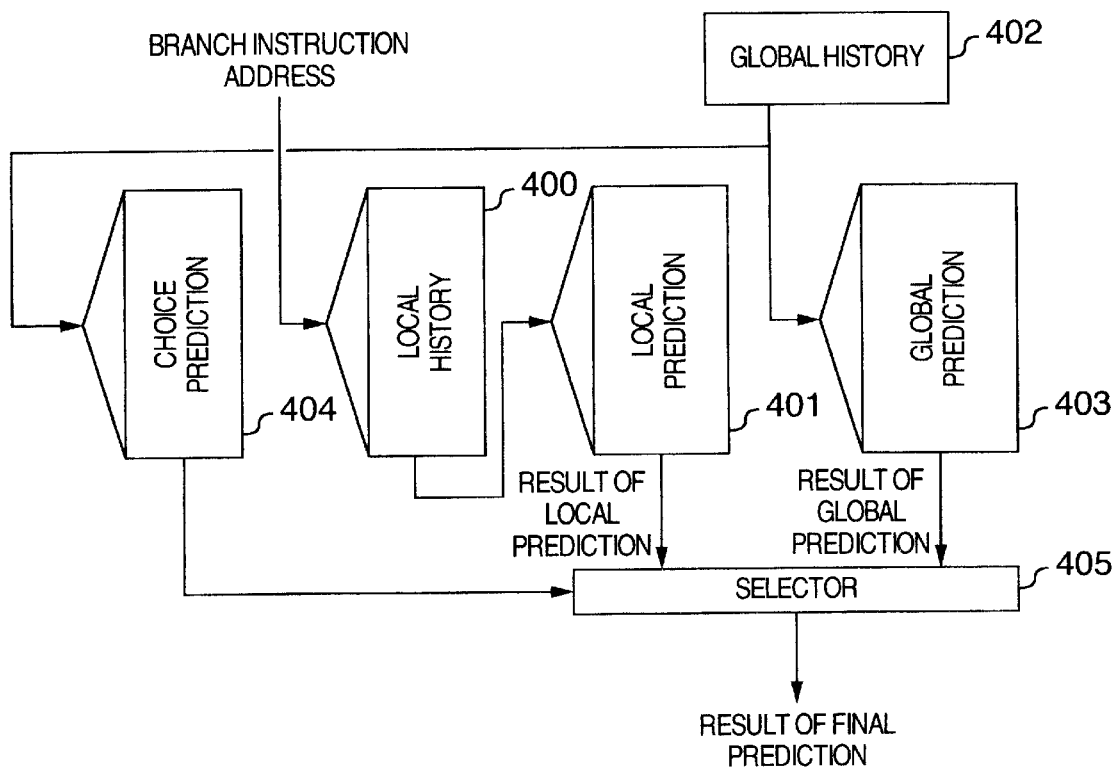
FIG. 3 is a block diagram showing a branch prediction apparatus of the prior art.

Referring now to the drawings, description will be given of embodiments of a branch prediction apparatus in accordance with the present invention.

FIG. 1 shows in a block diagram a first embodiment of a branch prediction apparatus of the present invention.

Each entry of a branch history table 100 includes a history bit and a 2-bit counter. Table 100 is accessed by low-order bits of an address of a branch instruction. The history bit and a value of the counter are outputted to a prediction generator 101 and a counter controller 102. The history bit is updated according to a result of the branch and the counter is updated by controller 102. When the result of execution of the branch instruction is asserted or determined, the result of branch is fed to table 100 and counter 102. Namely, a signal of "1" is fed for "taken" and a signal of "0" is fed for "not taken".

Figure 4:
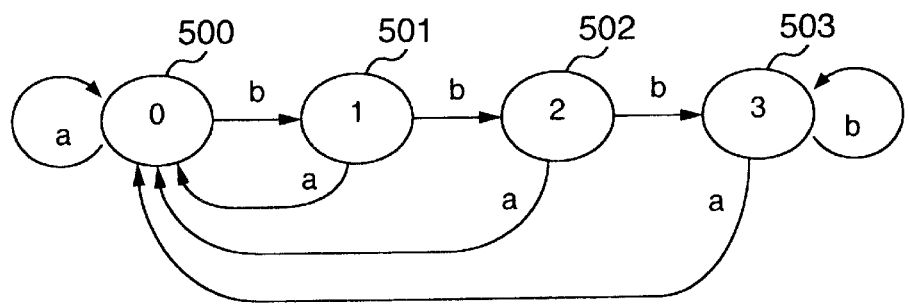
FIG. 4 is a state transition diagram of a counter used in the first embodiment of the present invention.

When the execution result of the branch instruction is asserted, counter controller 102 receives the result and the history bit and the value of the 2-bit counter before update and then updates the counter according to the state transition diagram of FIG. 4. In this diagram, four states, namely, states 500 to 503 respectively correspond to values 0 to 3 of the counter and an arrow a or b between the states represents a state transition condition. For example, in state 501, when the branch result is opposite to the previous result, namely, the previous result is "taken (1 for the history bit)" and the current result is "not taken (0 for the history bit)" or vice versa, a state transition takes from state 501 to state 50. The value "1" of the counter is updated to "2". Transition occurs for other state transitions in a similar fashion.

In prediction of a branch instruction, prediction generator 101 receives the value of the 2-bit counter from table 100. When the value is 0 or 2 (state 500 or 502), generator 101 outputs the value of the history bit. Namely, the branch result is equal to the previous result. When the value is 1 or 3 (state 501 or 503), generator 101 reverses the value of the history bit to output the resultant value. Namely, the branch result is opposite to the previous result.

In the first embodiment, for a branch pattern in which "taken" and "not taken" alternately and repeatedly appear, the prediction results as follows. Assume that the branch pattern is expressed as TNTNTN . . . , where T and N indicate "taken" and "not taken", respectively. The history bit and the counter values are each assumed to be in table 100. The prediction results in "not taken" in this state. Since the first branch result is T, the prediction is false. The history bit and the counter are set to 1 and 1, respectively. The next prediction is "not taken". Since the branch result is N, the prediction is true. The history bit and the counter are respectively set to 0 and 2. Similarly, the subsequent prediction is false and the history bit and the counter are respectively set to 1 and 3. The next prediction is "not taken". Since the branch result is N, the prediction is true and the history bit and the counter are kept unchanged, i.e., 0 and 3, respectively. After this point, so long as the branch results are TNTN . . . , the prediction is true.

In another branch pattern in which either "taken" or "not taken" appears consecutively, the counter value immediately changes to 0 (state 500) and hence the subsequent prediction is true.

In accordance with the present invention, by only slightly increasing the hardware, namely, by adding only the 1-bit history item to the 2-bit counter of the prior art, the branch pattern in which "taken" and "not taken" alternately and repeatedly appear can be correctly predicted while keeping prediction performance of the branch prediction apparatus of the prior art for the imbalanced branch pattern in which either "taken" or "not taken" mostly appears.

Figure 5:
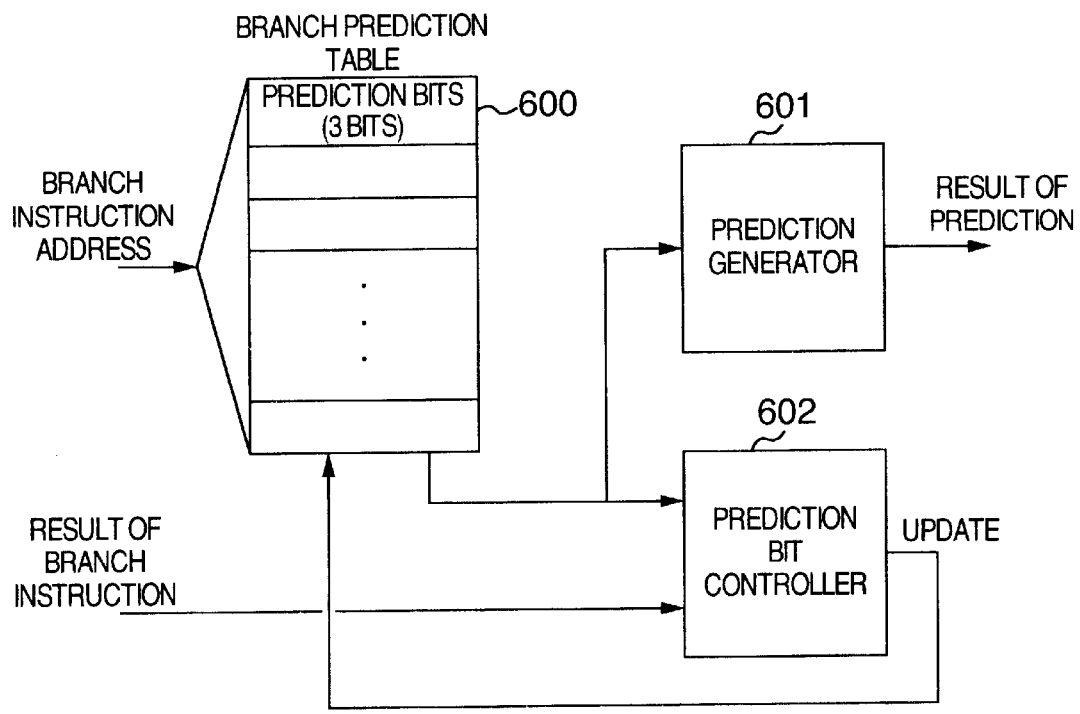
FIG. 5 is a block diagram showing a second embodiment of a branch prediction apparatus in accordance with the present invention.

FIG. 5 shows in a block diagram a second embodiment of a branch prediction apparatus in accordance with the present invention.

Each entry of a branch history table 600 includes three prediction bits. This table is accessed by low-order bits of an address of a branch instruction. The prediction bits are outputted to a prediction generator 601 and a prediction bit controller 602. The prediction bits are updated by controller 602.

Figure 6:
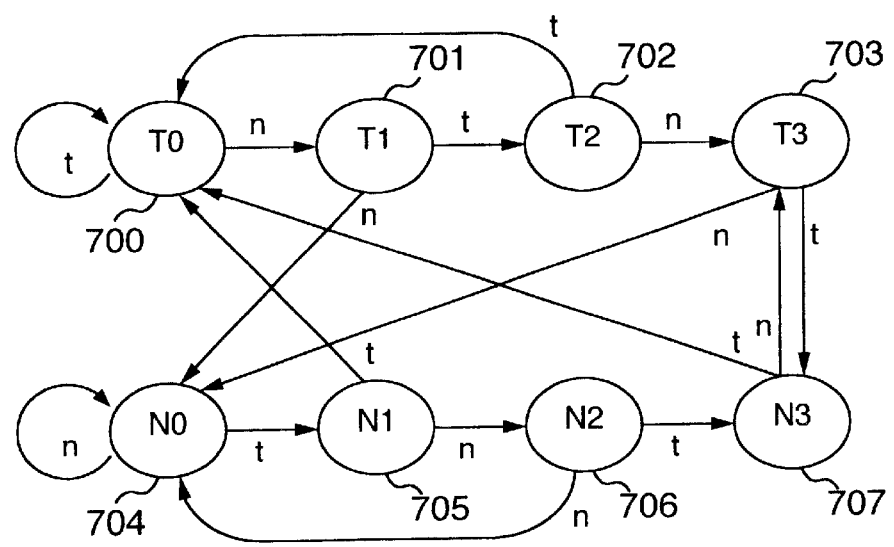
FIG. 6 is a state transition diagram of prediction bits used in the second embodiment of the present invention.

When an execution result of a branch instruction is asserted, controller 602 receives a branch result like that shown in FIG. 4 and a value of the prediction bits from table 600 and then updates the prediction bits according to the state transition diagram of FIG. 6. A one-to-one correspondence exists between eight states, i.e., states 700 to 707 and states expressed by three prediction bits. For example, values 0 to 7 of the prediction bits respectively correspond to states 700 to 707. An arrow t or n assigned between these states designates a state transition condition. For example, in state 701, when the branch is taken, the state is changed to state 702 and the value "1" of prediction bits is updated to "2". The state transition between other states takes place in a similar fashion.

When predicting a branch instruction, prediction generator 601 receives the prediction bits from table 600 and predicts a result of the branch instruction according to the value of the prediction bits. When the bits correspond to either one of states 700 to 703 of FIG. 6, generator 601 outputs "taken" as a result of prediction. When the bits correspond to either one of states 704 to 707 of FIG. 6, generator 601 outputs "not taken" as a prediction result.

The second embodiment of a branch prediction apparatus is functionally equivalent to the first embodiment and achieve almost the same prediction. These embodiments are substantially equal in quantity of necessary hardware to each other.

Figure 7:
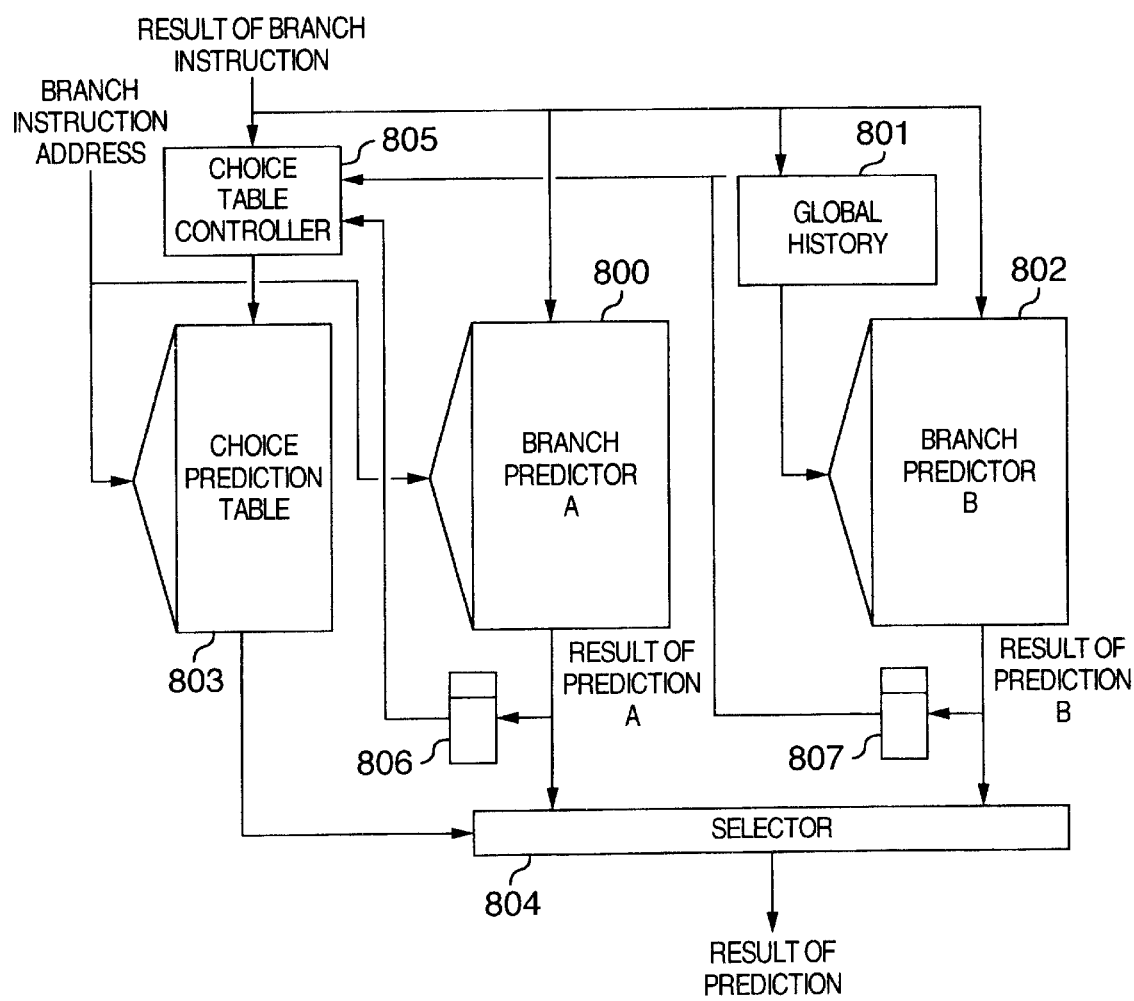
FIG. 7 is a block diagram showing a third embodiment of a branch prediction apparatus in accordance with the present invention.

FIG. 7 shows in a block diagram a third embodiment of a branch prediction apparatus in accordance with the present invention.

A local branch predictor 800 is a branch prediction apparatus of the first or second embodiment. A global branch predictor 802 predicts a result of a branch instruction according to a global history 801 including a comprehensive history of all branch instructions. Choice prediction table 803 includes an up-down counter of a saturation type and is accessed by low-order bits of an address of a branch instruction as in local predictor 800.

Local and global branch predictors 800 and 802 predict a result of a branch instruction in respective prediction methods to produce prediction results A and B, respectively. Results A and B are held in latches 806 and 807, respectively. At the same time, table 803 outputs a higher-most bit of the counter to a selector 804. If the bit is 1, selector 804 selects prediction result A, and if the bit is 0, selector 804 selects prediction result B and outputs result B as a final result of prediction.

When an execution result of the branch instruction is asserted, the branch result is delivered to local branch predictor 800, global branch predictor 802, and a choice table controller 805. In response thereto, global history 801 updates its contents and local and global branch predictors 800 and 802 update respective prediction tables in almost the same way as for the first and second embodiments. Controller 805 receives prediction results A and B respectively from latches 806 and 807 to compare the branch result with the respective prediction results. When the branch result is equal to result A and the branch result is opposite to result B, controller 805 adds a value to the value of the counter of table 803. When the branch result is opposite to result A and the branch result is equal to result B, controller 805 subtracts a value from the value of the counter of table 803. Several cycles lapse from prediction of a branch instruction to assertion of a result of the branch instruction. Consequently, if other branch instructions are to be predicted during a period of several cycles, latches 806 and 807 will construct queues to respectively hold a plurality of results of prediction.

In accordance with the present invention, by a branch predictor of the first or second embodiment and a global branch predictor, a branch prediction apparatus is implemented to select prediction according to a tendency of each branch instruction.

The first to third embodiments are branch prediction apparatuses only to predict "taken" or "not taken" for a branch instruction. However, the present invention is also applicable to a branch prediction apparatus which additionally produces an address of an instruction at a branch destination. In this situation, the present invention is applicable to a section thereof to predict "taken" or "not taken" for a branch instruction.

In accordance with the present invention, with a slight increase in hardware, namely, with an addition of one bit to the 2-bit counter of the prior art, the branch pattern in which "taken" and "not taken" alternately and repeatedly appear can be appropriately predicted while keeping prediction performance of the branch prediction apparatus of the prior art for the imbalanced branch pattern in which either "taken" or "not taken" mostly appears. Furthermore, by two branch predictors including a branch predictor of the first or second embodiment and a global branch predictor, a branch prediction apparatus can be implemented to select prediction according to a tendency of each branch instruction.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A branch prediction apparatus, comprising:
   a branch prediction table for storing one history bit and a 2-bit counter for each branch instruction, the history bit and the 2-bit counter being updated according to a result of a "branch taken" or a "branch not taken" for the branch instruction;
   a prediction generator for outputting, when the 2-bit counter has a value of 0 or 2 for a branch instruction, a value of the history bit as a result of predictions, and for outputting, when the 2-bit counter has a value of 1 or 3 for a branch instruction, a value obtained by reversing the history bit as a result of prediction; and
   a counter controller for comparing branch instruction result with a value of the history bit before update, for setting 0 to the 2-bit counter value when the branch instruction result matches the value of the history bit before update, and for adding, when the branch instruction result does not match the value of the history bit before update and the 2-bit counter value is other than 3, one to the 2-bit counter value.

2. A branch prediction apparatus, comprising:
   a branch prediction table having prediction bits for each branch instruction to store a result of state transition thereof among eight states including first four states and second four states;
   a prediction generator for outputting, when the prediction bits are in one of the first four states, a "branch taken" as a result of prediction, and for outputting, when the prediction bits are in one of the second four states, "branch not taken" as a result of prediction; and
   a prediction bit controller for controlling the prediction bits,
   wherein the prediction generator generates, when a result of a branch instruction is equal to a previous result thereof, a result of prediction equal to the current result of the branch instruction at a next prediction of the branch instruction, wherein the prediction generator generates, when a result of a branch instruction is opposite to a previous result thereof and this condition occurs once or consecutively three times, a result of prediction opposite to the current result of the branch instruction at a next prediction of the branch instruction, and wherein the prediction generator generates, when a result of a branch instruction is opposite to a previous result thereof and this condition occurs successively two times, a result of prediction equal to the current result of the branch instruction at a next prediction of the branch instruction.

3. A branch prediction apparatus, comprising:

a first branch predictor, including:
  a branch prediction table for storing three prediction bits for each branch instruction,
  a branch prediction table for storing one history bit and a 2-bit counter to be updated according to a result of a "branch taken" or a "branch not taken" for each branch instruction,
  a prediction generator for outputting, when the counter has a value of 0 or 2 for a branch instruction, a value of the history bit as a result of prediction, and for outputting, when the counter has a value of 1 or 3 for a branch instruction, a value obtained by reversing the history bit as a result of prediction, and
  a counter controller for comparing a branch instruction result with a value of the history bit before update, for setting 0 to the 2-bit counter value when the branch instruction result matches the value of the history bit before update, and for adding one to the 2-bit counter value when the branch instruction result does not match the value of the history bit before update and the counter value is other than 3;

a second branch predictor for predicting a branch instruction according to a comprehensive history of all branch instructions;

a choice prediction table for keeping information to be updated according to "true" or "false" of predictions by the first and second branch predictors; and a selector for selecting one of the predictions by the first and second branch predictors according to the information of the choice prediction table.

4. A branch prediction apparatus according to claim 3, further comprising:

a choice table controller for adding a value to the value of the counter when the choice prediction table keeping a counter for each branch instruction and the prediction by the first branch predictor are valid and for subtracting a value from the value of the counter when the prediction by the second branch predictor is valid.

5. A branch prediction apparatus, comprising:

a first branch predictor, including:
  a branch prediction table having prediction bits for each branch instruction; to store the result of state transition thereof among eight states including first four states and second four states,
  a prediction generator for outputting, when the prediction bits are in one of the first four states, a "branch taken" as a result of prediction and for outputting, when the prediction bits are in one of the second four states, a "branch not taken" as a result of prediction, and
  a prediction bit controller for controlling the prediction bits,
  wherein the prediction generator generates, when a result of a branch instruction is equal to a previous result thereof, a result of prediction equal to the current result of the branch instruction at a next prediction of the branch instruction,
  wherein the prediction generator generates, when a result of a branch instruction is opposite to a previous result thereof and this condition occurs once or consecutively three times, a result of prediction opposite to the current result of the branch instruction at a next prediction of the branch instruction,
  wherein the prediction generator generates, when a result of a branch instruction is opposite to a previous result thereof and this condition occurs successively two times, a result of prediction equal to the current result of the branch instruction at a next prediction of the branch instruction;

a second branch predictor for predicting a branch instruction according to a comprehensive history of all branch instructions;

a choice prediction table for keeping information to be updated according to "true" or "false" of predictions by the first and second branch predictors; and a selector for selecting one of the predictions by the first and second branch predictors according to the information of the choice prediction table.

6. A branch prediction apparatus according to claim 5, further comprising:

a choice table controller for adding a value to the value of the counter when the choice prediction table keeping a counter for each branch instruction and the prediction by the first branch predictor are valid and for subtracting a value from the value of the counter when the prediction by the second branch predictor is valid.

* * * * *